United States Patent
Soehnle

[11] Patent Number: 6,166,335
[45] Date of Patent: Dec. 26, 2000

[54] BATHROOM SCALE

[75] Inventor: Armin Soehnle, Murrhardt, Germany

[73] Assignee: Soehnle AG, Montlingen, Switzerland

[21] Appl. No.: 09/284,962

[22] PCT Filed: Aug. 20, 1997

[86] PCT No.: PCT/EP97/04523

§ 371 Date: Aug. 2, 1999

§ 102(e) Date: Aug. 2, 1999

[87] PCT Pub. No.: WO98/20310

PCT Pub. Date: May 14, 1998

[30]    Foreign Application Priority Data

Nov. 5, 1996 [DE] Germany ............... 196 45 534

[51] Int. Cl.[7] .................. G01G 23/30; G01G 3/14; G01G 19/44; H02P 9/04
[52] U.S. Cl. .................. 177/177; 177/210 R; 290/1 R; 290/1 C
[58] Field of Search ................. 177/177, 210 R; 290/1 R, 1 C

[56]           References Cited

U.S. PATENT DOCUMENTS

| 3,573,479 | 4/1971 | Rieth | 290/1 C |
| 3,785,447 | 1/1974 | Blackerby | 177/210 R |
| 4,258,812 | 3/1981 | Pfeiffer | 177/210 R |
| 5,048,054 | 9/1991 | Brandorff et al. | 177/145 |
| 5,141,065 | 8/1992 | Maxwell et al. | 177/210 R |
| 5,561,274 | 10/1996 | Brandorff | 177/145 |

FOREIGN PATENT DOCUMENTS

| 2849918 | 7/1979 | Germany . |
| 4432858A1 | 3/1996 | Germany . |
| 2065983A | 7/1981 | United Kingdom . |
| 2088651A | 6/1982 | United Kingdom . |
| WO 86/07504 | 12/1986 | WIPO . |

*Primary Examiner*—Randy W. Gibson
*Attorney, Agent, or Firm*—Jones, Tullar & Cooper, P.C.

[57]           ABSTRACT

A bathroom scale has a measurement value sensor which generates a measurement signal when a person wishing to be weighed stands on the scale. The measurement signal is transmitted to an evaluation circuit which reduces therefrom the weight and displays it on a display device. The evaluation circuit and the display device are supplied with electric energy by a generator upon which the weight of the person wishing to be weighed is applied. The actuation element for the generator is designed as a plunger which drives the generator by means of a toothed rack and pinion and projects over the plate in such a way that it can be actuated independently of the same. The restoring spring acts between the plate and the toothed rack and pinion.

8 Claims, 1 Drawing Sheet

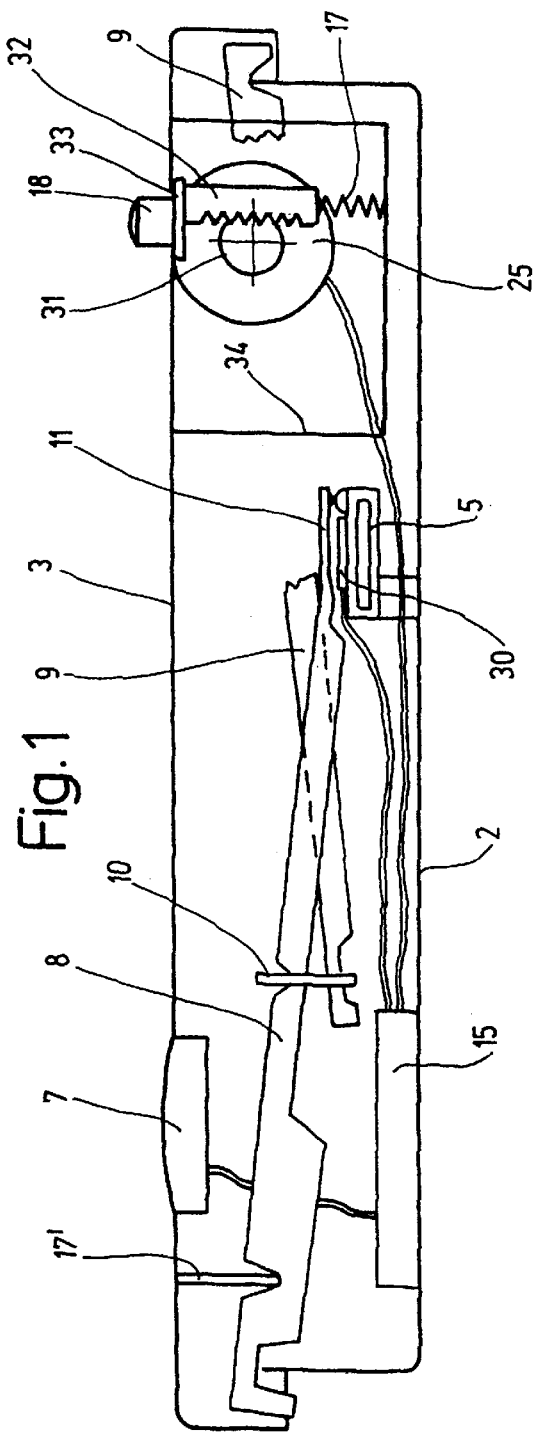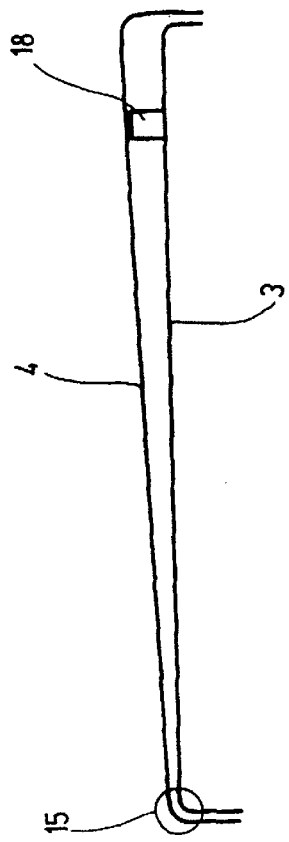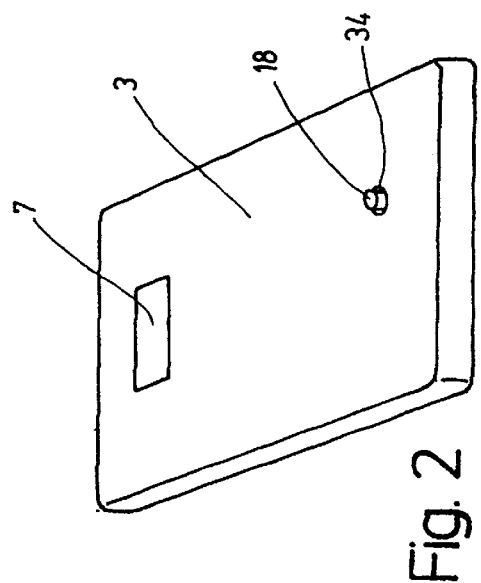

BATHROOM SCALE

FIELD OF THE INVENTION

The present invention relates to a bathroom scale having a measurement value sensor, which when the person weighing himself stands on it, it generates a measurement signal that reaches an evaluation circuit, from the measurement signal person ascertains the weight and displays it on a display device. The supply of electrical energy to the evaluation circuit and the display device is accomplished by a generator, which is mounted in a plane upon which the weight of the person weighing himself acts, wherein the generator is mechanically actuatable by an actuating element, which is subsequently returned to its outset position by a restoring spring compressed upon actuation.

FIELD OF THE INVENTION

One such bathroom scale is known from published German Patent Disclosure, DE 44 33 858 A1. As disclosed wherein the aforementioned plate (first plate), a further plate, the actual tread plate, is disposed, and it is on that plate that the actuating element (there referred to as a cam) is disposed in fixed fashion. When a person steps on the tread plate, the cam meets a horizontally displaceable further actuating element of the generator; the generator is thus set in motion and generates electrical energy. The restoring spring is disposed between the first plate and the tread plate.

A disadvantage of this arrangement is the uneven introduction of force from the tread plate into the horizontally displaceable actuating element of the generator; this introduction of force depends very strongly on how and at what point a person puts his weight on the tread plate.

BACKGROUND OF THE INVENTION

The object of the present invention is to provide a scale of the type defined at the outset in such a way that its design and actuation become simpler.

According to the present invention, this object is attained by embodying the actuating element as a tappet which drives the generator via a toothed rack and a pinion, and protrudes past the plate in such a way that it is actuatable independently of the plate, with the restoring spring becoming operation between the plate and the toothed rack and pinion. The present invention also relates to various advantageous refinements.

The design is thus substantially simpler, especially because the transmission of force from the tappet to the generator is effected by a toothed rack and pinion arrangement, and the restoring spring becomes operative at the toothed rack in a very much less complicated way that is less vulnerable to malfunction. In both cases, namely upon direct actuation of the tappet 18 with one's foot before weighing or upon actuation of the tappet by a tread plate disposed above it, a certain and reliable actuation is achieved in a simple way.

BRIEF DESCRIPTION OF THE DRAWINGS

Exemplary embodiments of the present invention and their advantageous refinements will be described in detail below with reference to the appended drawings. Shown are:

FIG. 1, which is a first exemplary embodiment of the present invention;

FIG. 2, which is a plan view of a bathroom scale of FIG. 1; and

FIG. 3, which is a schematic illustration of a second exemplary embodiment of the present invention.

DESCRIPTION OF THE PREFERRED EMBODIMENTS

The scale of FIG. 1 has a bottom part that is formed by a bottom, or support plate 2 and a vertical rim 2' extending all the way around. Located above this bottom part is a movable top plate 3, which acts on weighing levers 8, 9 via posts 17'. Two weighing levers 8 and two weighing levers 9 are provided, only one of each of which are visible in FIG. 1. The two weighing levers 8 are both connected to a pressure plate 11, which acts on a measurement value sensor 5 (or weighing cell). In this weighing cell, a measurement signal is derived, for instance with the aid of a strain gauge 30, and this signal reaches an evaluation circuit 15, and from the evaluation circuit 15 ascertains the weight of the person weighing himself and causes the weight to be displayed on a display device 7. The display device 7 is disposed in the plate 3 so that it can be seen from above. To the extent described thus far, the mechanical arrangement of this bathroom scale is described in the referenced published German Patent Disclosure DE 44 33 858 A1 referred to above, so that in the present context it need not be described in further detail.

The electrical supply to the evaluation circuit 15 and the display device 7 is effected by a generator 25. This may be a simple dynamo, of the kind used in bicycles or in manually actuated flashlights, for instance. The shaft of the dynamo is provided with a pinion (gear wheel) 31, which meshes with a toothed rack 32 that is guided in corresponding guides (not shown) so that it can be displaced vertically up and down. The toothed rack 32 is fixedly connected to the tappet 18, which is accessible from above through an opening 33 in the plate 3 and protrudes to a certain distance past the opening, so that before or after a person stands on the scale 3, which then acts as an actual weighing plate, one actuates the tappet 18 with one's foot and can thus generate the requisite current for the evaluation circuit 15 and the display device 7.

The generator 25 is flanged from below to the plate 3 and is provided with a cup-shaped covering 34, in which the guides for the motion of the toothed rack 32 are also provided. In this way it is assured that the stress on the tappet 18 does not cause any short-circuiting of force to the measurement value sensor 5.

FIG. 3 schematically shows a second exemplary embodiment. It is designed in principle just like that of FIG. 1. The only addition is that a tread plate 4 that when stepped on acts on the tappet 18 is located above the plate 3. When the tappet is actuated, the tread plate 4 is then seated directly on the plate 3, so that the weight of the person standing on the plate 4 acts directly on the plate 3 and from there then becomes effective at the measurement value sensor 5. The left-hand end (in terms of FIG. 3) of the tread plate 4 is bent over the left-hand end of the plate 3 or mounted on it in such a way that a joint 15 is created, about which the right-hand end of the tread plate 4, that is, the end that acts on the tappet 18, is pivotable.

What is claimed is:

1. A bathroom scale, comprising:
   a bottom plate;
   a top plate;
   a display device mounted to said top plate;
   a measurement value sensor;
   an evaluation circuit, both said measurement value sensor and said evaluation circuit being situated in said bottom plate, said measurement value sensor generates a measurement signal and applies it to said evaluation circuit, from said signal said evaluation circuit ascertains the weight of the person on the scale and displays it on said display device;

a generator;

a cup-shaped housing; and actuating means for mechanically actuating said generator to supply electrical energy to said evaluation circuit and said measurement value sensor when weight is placed on the scale, said actuating means including a toothed rack and pinion, an actuating element embodied as a tappet, said tappet protruding above said top plate, and a restoring spring for restoring said generator to terminate the supply of electrical energy to said evaluation circuit and said measurement value sensor when the weight is removed from the scales, wherein said tappet is actuated independently of said top plate and wherein said toothed rack and pinion and said restoring spring are mounted in said cup-shaped housing.

2. The bathroom scale as defined in claim 1, wherein said top plate is movable relative to said bottom plate and serves as the plate on which the person to be weighed stands.

3. The bathroom scale as defined in claim 1, wherein said generator, said toothed rack and pinion and said tappet form a unit mounted to said top plate.

4. The bathroom scale as defined in claim 3, wherein said unit is covered by said cup-shaped housing.

5. The bathroom scale as defined in claim 1, further comprising:

a tread, plate pivotably connected to said top plate and situated to act on said actuating means.

6. A bathroom scale, comprising:

a bottom plate;

a top plate;

a display device mounted to said top plate;

a measurement value sensor;

an evaluation circuit connected to said measurement value sensor and to said display, said measurement value sensor generates a measurement signal when a weight is placed on said top plate and applies the signal to said evaluating circuit, from said signal said evaluation circuit ascertains the weight placed on said top plate and displays it on said display device;

a generator for supplying energy to said evaluation circuit and said measurement value sensor;

a cup-shaped housing mounted to said top plate; and actuating means for mechanically actuating said generator to supply the energy to said evaluation circuit and said measurement value sensor when weight is placed on said top plate, said actuating means including a generator engagement portion, a restoring portion and a tappet protruding from said top plate, wherein said actuating means forms a unit housed in said cup-shaped housing, said restoring portion serving to restore said generator to terminate the supply of electrical energy to said evaluation circuit and said measurement value sensor when weight is removed from the scale.

7. The bathroom scale as defined in claim 6, wherein said restoring portion is mounted to said cup-shaped housing and said generator engagement portion.

8. The bathroom scale as defined in claim 7, wherein said generator engagement portion comprises a rack and pinion, and said restoring portion comprises a spring.

* * * * *